United States Patent
Deng et al.

(10) Patent No.: US 7,964,297 B2
(45) Date of Patent: *Jun. 21, 2011

(54) ADHESION LAYER FOR THIN FILM MAGNETIC RECORDING MEDIUM

(75) Inventors: Hong Deng, San Jose, CA (US);
Yoshihiro Ikeda, San Jose, CA (US);
Mary Frances Minardi, Santa Cruz, CA (US); Kentaro Takano, San Jose, CA (US); Kai Tang, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 12/653,216

(22) Filed: Dec. 9, 2009

(65) Prior Publication Data
US 2010/0091402 A1 Apr. 15, 2010

Related U.S. Application Data

(63) Continuation of application No. 11/118,850, filed on Apr. 28, 2005, now Pat. No. 7,651,794.

(51) Int. Cl.
*G11B 5/127* (2006.01)
*G11B 5/71* (2006.01)

(52) U.S. Cl. ............... 428/828; 428/846.2; 428/846.4; 360/135

(58) Field of Classification Search ............ 428/693.1, 428/828, 336, 840, 831, 695, 141, 693, 832, 428/832.1, 611, 836, 829, 698, 826, 827, 428/831.2, 846.7, 846.2, 846, 64.2; 360/135, 360/325, 97.01; 438/540; 324/464; 228/121
See application file for complete search history.

(56) References Cited

U.S. PATENT DOCUMENTS

| | | | |
|---|---|---|---|
| 4,454,014 A | 6/1984 | Bischoff | |
| 4,632,883 A | 12/1986 | Howard et al. | |
| 5,589,262 A | 12/1996 | Kiuchi et al. | |
| 5,626,943 A | 5/1997 | Tenhover | |
| 5,626,943 A * | 5/1997 | Tenhover | 428/141 |
| 5,815,343 A | 9/1998 | Ishikawa et al. | |
| 6,428,906 B1 | 8/2002 | Wong et al. | |
| 6,562,489 B2 | 5/2003 | Abarra et al. | |
| 6,828,047 B2 | 12/2004 | Abarra et al. | |

(Continued)

FOREIGN PATENT DOCUMENTS

JP 59172162 A1 9/1984

(Continued)

*Primary Examiner* — Kevin M. Bernatz
*Assistant Examiner* — Louis Falasco
(74) *Attorney, Agent, or Firm* — G. Marlin Knight

(57) ABSTRACT

The invention uses an adhesion layer of an amorphous alloy of aluminum. A first aluminum titanium embodiment of the amorphous adhesion layer preferably contains approximately equal amounts of aluminum and titanium (+/−5 at. %). A second embodiment of the amorphous adhesion layer preferably contains approximately equal amounts of aluminum and titanium (+/−5 at. %) and up to 10 at. % Zr with 5 at. % Zr being preferred. A third embodiment is aluminum tantalum preferably including from 15 to 25 at. % tantalum with 20 at. % being preferred. The most preferred compositions are $Al_{50}Ti_{50}$, $Al_{47.5}Ti_{47.5}Zr_5$ or $Al_{80}Ta_{20}$. The adhesion layer is deposited onto the substrate. The substrate can be glass or a metal such as NiP-plated AlMg. The preferred embodiment of media according to the invention is for perpendicular recording and includes a magnetically soft underlayer deposited above the adhesion layer.

16 Claims, 2 Drawing Sheets

U.S. PATENT DOCUMENTS

| | | | |
|---|---|---|---|
| 6,863,993 B1 | 3/2005 | Doerner et al. | |
| 6,872,478 B2 | 3/2005 | Bian et al. | |
| 7,374,831 B2 * | 5/2008 | Araki et al. | 428/832 |
| 7,498,092 B2 * | 3/2009 | Berger et al. | 428/829 |
| 7,651,794 B2 * | 1/2010 | Deng et al. | 428/831 |
| 7,875,371 B2 * | 1/2011 | Arai et al. | 428/831.2 |
| 2001/0008716 A1 * | 7/2001 | Matsuda et al. | 428/611 |
| 2001/0024742 A1 | 9/2001 | Bian et al. | |
| 2001/0033949 A1 * | 10/2001 | Abarra et al. | 428/836 |
| 2002/0018920 A1 * | 2/2002 | Yamamoto et al. | 428/831 |
| 2002/0028357 A1 * | 3/2002 | Shukh et al. | 428/828 |
| 2002/0061424 A1 | 5/2002 | Nanis | |
| 2002/0122958 A1 | 9/2002 | Tanahashi et al. | |
| 2002/0122959 A1 | 9/2002 | Matsunuma | |
| 2003/0022023 A1 | 1/2003 | Carey et al. | |
| 2003/0034781 A1 | 2/2003 | Abdel-Rahman | |
| 2003/0091798 A1 | 5/2003 | Zheng et al. | |
| 2003/0104247 A1 * | 6/2003 | Girt | 428/693 |
| 2003/0134151 A1 | 7/2003 | Usuki et al. | |
| 2003/0219633 A1 * | 11/2003 | Sulin et al. | 428/698 |
| 2004/0009375 A1 * | 1/2004 | Tanahashi et al. | 428/695 |
| 2004/0106010 A1 | 6/2004 | Iwasaki et al. | |
| 2004/0146686 A1 * | 7/2004 | Kim et al. | 428/65.5 |
| 2004/0214049 A1 * | 10/2004 | Yamamoto et al. | 428/831 |
| 2005/0008902 A1 * | 1/2005 | Bertero et al. | 428/828 |
| 2005/0030676 A1 * | 2/2005 | Fukuzawa et al. | 360/325 |
| 2005/0040210 A1 | 2/2005 | Sandin | |
| 2005/0244679 A1 * | 11/2005 | Arai et al. | 428/828 |

FOREIGN PATENT DOCUMENTS

| | | |
|---|---|---|
| JP | 60239916 A1 | 11/1985 |
| JP | 61248219 A1 | 11/1986 |
| JP | 63193324 A1 | 8/1988 |
| JP | 63317922 A1 | 12/1988 |
| JP | 3017825 A1 | 1/1991 |

* cited by examiner

ADHESION LAYER FOR THIN FILM MAGNETIC RECORDING MEDIUM

RELATED APPLICATIONS

This application is a continuation or divisional application of the co-pending parent application bearing Ser. No. 11/118,850, which has a filing date of Apr. 28, 2005, and is now U.S. Pat. No. 7,651,794. The referenced parent application is hereby incorporated by reference herein.

FIELD OF THE INVENTION

The invention relates to magnetic thin film media and more particularly to methods and materials for ensuring adhesion of the thin films in such media to the substrate.

BACKGROUND OF THE INVENTION

A typical prior art head and disk system 10 is illustrated in block form in FIG. 1. In operation the magnetic transducer 20 is supported by the suspension 13 as it flies above the disk 16. The magnetic transducer 20, usually called a "head" or "slider," is composed of elements that perform the task of writing magnetic transitions (the write head 23) and reading the magnetic transitions (the read head 12). The electrical signals to and from the read and write heads 12, 23 travel along conductive paths (leads) 14 which are attached to or embedded in the suspension 13. The magnetic transducer 20 is positioned over points at varying radial distances from the center of the disk 16 to read and write circular tracks (not shown). The disk 16 is attached to a spindle 18 that is driven by a spindle motor 24 to rotate the disk 16. The disk 16 comprises a substrate 26 on which a plurality of thin films 21 are deposited. The thin films 21 include ferromagnetic material in which the write head 23 records the magnetic transitions in which information is encoded.

Magnetic media for perpendicular recording include a magnetically soft underlayer which is relatively thick (>100 nm). The combination of thickness and the residual stresses in the films creates a driving force for delamination of the films. The deposition of an appropriate adhesion layer onto the substrate can reduce delamination.

In published US patent application 20040146686 by Kim, et al., Jul. 29, 2004 an adhesion layer is described which is formed between the disk substrate and the soft magnetic layer. A material "containing Ti" is taught for use as an adhesion layer with a thickness range of 1-50 nm, but the only example of the adhesion layer is 100% Ti.

In published US patent application 20040009375 by Tanahashi, et al. Jan. 15, 2004, a "pre-coat layer" is deposited onto the substrate which is said to be selected for good adhesion is described as being nickel 37.5 at.% tantalum 10 at. % with the remainder being Zr.

In published US patent application 20020122959 by Matsunuma, Satoshi, et al., Sep. 5, 2002 an adhesive layer such as 5 nm of Ti may be formed on the substrate of the magnetic recording medium before forming the soft magnetic layer.

In published US patent application 20020122958 by Tanahashi, Kiwamu, et al. Sep. 5, 2002, a material which shows adhesion with the substrate, has a flat surface and reacts little with the soft magnetic underlayer with annealing is used as the pre-coating layer for the substrate. Amorphous or nanocrystalline materials such as NiZr alloy, NiTa alloy, NiNb alloy, NiTaZr alloy, NiNbZr alloy, CoCrZr alloy and NiCrZr alloy can be used.

In U.S. Pat. No. 6,428,906 to Wong, et al., Aug. 6, 2002, an underlayer is described which can be close packed hexagonal (hcp) Ti or TiCr deposited to promote the growth of a hcp Co alloy perpendicular to the plane of the films. For perpendicular recording, a magnetically soft layer, for example, NiFe, is added to provide an image effect for the writing process. In a preferred embodiment of the invention, an underlayer deposited on top of the soft underlayer of NiFe is titanium aluminum (TiAl) preferably having a $L1_0$ lattice structure. The TiAl is not used as an adhesion layer in this case.

U.S. Pat. No. 5,589,262 to Kiuchi, et al., Dec. 31, 1996, describes an adhesion layer formed between the substrate and the underlayer which made of titanium (Ti) or chromium (Cr).

Published US patent application 20030091798 by Zheng, Min, et al., May 15, 2003, uses an intermediate tantalum layer deposited between the soft magnetic layer and the substrate to improve adhesion of the soft magnetic layer to the substrate.

A beta-Ta layer between a silicon substrate and a NiFe layer serves as an adhesion layer in U.S. Pat. No. 4,632,883 Howard, et al. Dec. 30, 1986.

SUMMARY OF THE INVENTION

The invention uses an adhesion layer of an amorphous alloy of aluminum. A first aluminum titanium embodiment of the amorphous adhesion layer preferably contains approximately equal amounts of aluminum and titanium (+/−5 at. %). A second embodiment of the amorphous adhesion layer preferably contains approximately equal amounts of aluminum and titanium (+/−5 at. %) and up to 10 at. % Zr with 5 at. % Zr being preferred. A third embodiment of the amorphous adhesion layer is aluminum tantalum preferably including from 15 to 25 at. % tantalum with 20 at. % being preferred. The most preferred compositions are $Al_{50}Ti_{50}$, $Al_{47.5}Ti_{47.5}Zr_5$ or $Al_{80}Ta_{20}$. The adhesion layer is deposited onto the substrate. The substrate can be glass or a metal such as NiP plated AlMg. The preferred embodiment of media according to the invention is for perpendicular recording and includes a magnetically soft underlayer deposited above the adhesion layer.

DETAILED DESCRIPTION OF THE INVENTION AND THE PREFERRED EMBODIMENTS

Figure 1:
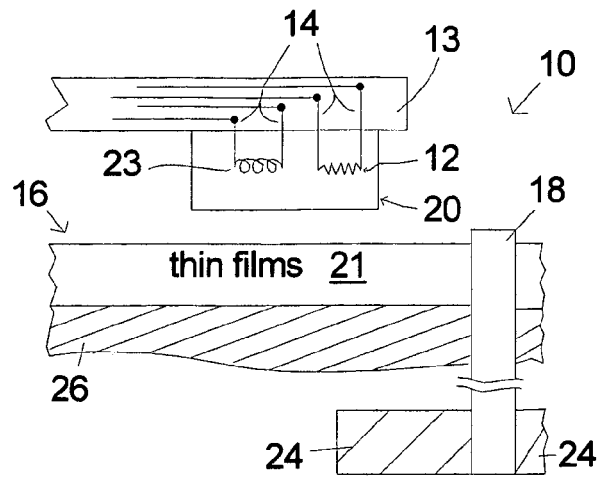
FIG. 1 is a symbolic illustration of the prior art showing the relationships between the head and associated components in a disk drive.
Figure 2:
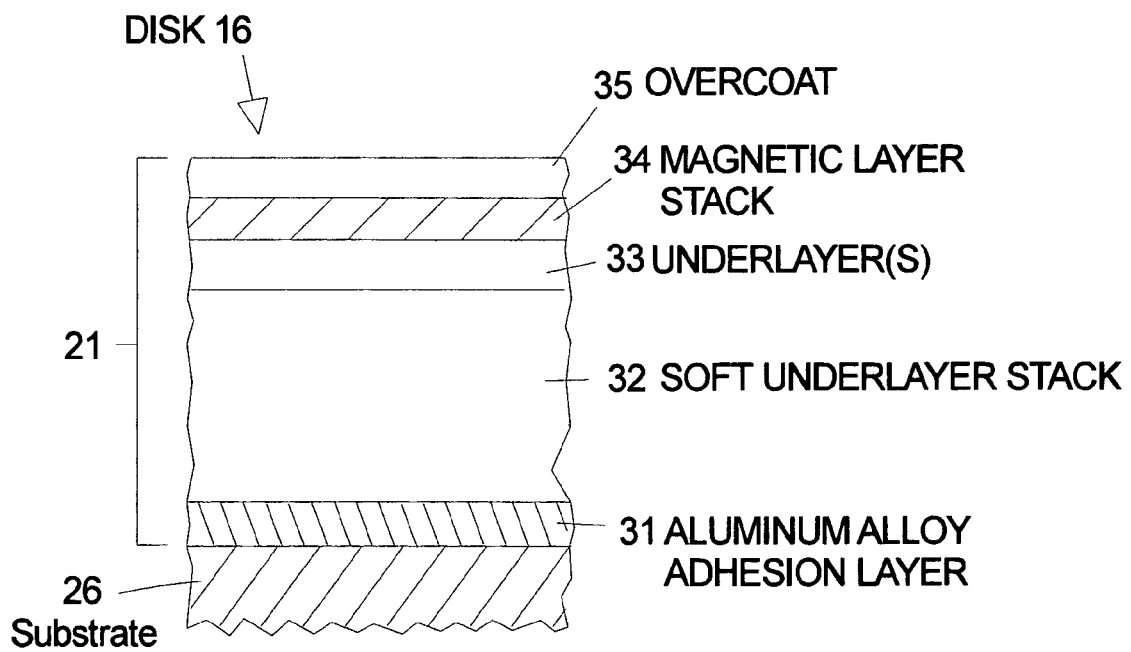
FIG. 2 is an illustration of a layer structure for a magnetic thin film disk including an adhesion layer according to the invention.

A disk 16 for perpendicular recording, shown in FIG. 2, includes substrate 26 of glass or AlMg with an electroless coating of NiP that has been highly polished, or other suitable materials such as glass-ceramic substrate. An adhesion layer 31 according to the invention is deposited directly on the substrate. Any thin film deposition technique can be used with sputtering being preferred. The preferred thickness for the adhesion layer is 3-10 nm.

Magnetic media for perpendicular recording include a magnetically soft underlayer (SUL) stack 32 which is relatively thick (>100 nm). Materials typically used for the SUL stack 32 include high saturation magnetization (Ms) amorphous cobalt alloys such as CoTaZr, CoZrNb or CoFeB. The SUL stack 32 may contain multiple cobalt alloy layers possibly with differing compositions. One preferred embodiment consists of two CoTaZr layers separated by a 0.6 nm thick Ru layer to form an antiferromagnetically coupled SUL stack. The combination of thickness and the residual stresses in the films creates a driving force for delamination of the films. The deposition of the adhesion layer 31 according to the invention can reduce delamination. The use of an amorphous Al-alloy adhesion layer directly beneath one of the amorphous Co-alloy layers helps to maintain the desired amorphous structure in the SUL. For certain embodiments it may also be advantageous to have additional layers between the adhesion layer and the SUL stack. These layers would be used to further control the structure and/or magnetic anisotropy direction of the SUL stack. The disk also includes various other layers such as a protective overcoat layer 35 that is used to improve durability and corrosion resistance. Multiple underlayers 33 and multilayered magnetic films 34 can be used with the adhesion layer according to the invention.

The materials for the adhesion layer 31 are alloys of aluminum. The aluminum titanium embodiment preferably contains approximately equal amounts of aluminum and titanium (+/−5 at. %). The aluminum titanium zirconium embodiment preferably contains approximately equal amounts of aluminum and titanium (+/−5 at. %) and up to 10 at. % Zr with 5 at. % Zr being preferred. The aluminum tantalum embodiment preferably includes from 15 to 25 at. % tantalum with 20 at. % being preferred.

Figure 3:
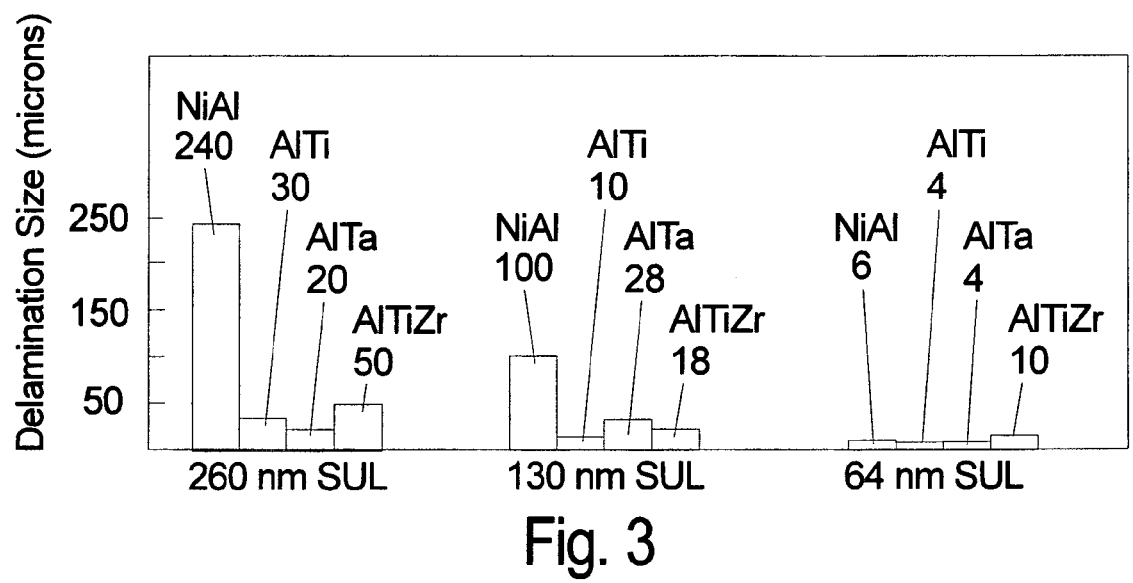
FIG. 3 is a graph of delamination tests comparing adhesion layers according to the invention with a NiAl adhesion layer.

FIG. 3 is a bar chart representation of the results of comparing a NiAl adhesion layer with three adhesion layers according to the invention. A standard scratch test was performed. The larger delamination sizes for this test are inversely related to the adhesion strength of the thin films; therefore, a lower delamination size is better. The adhesion layers according to the invention are amorphous, but the NiAl layer is crystalline with a B2 structure. NiAl is used for comparison because it has been used on glass substrates in longitudinal media and is known to have acceptable adhesion in media that do not have a thick SUL. The three sets of bars correspond to SUL stack thicknesses of 260 nm, 130 nm and 64 nm. With the SUL stack thickness of 260 nm the NiAl adhesion layer resulted in a delamination size of 240 microns, while the AlTi adhesion layer resulted in a delamination size of 30 microns. The AlTa adhesion layer resulted in a delamination size of 20 microns. The AlTiZr adhesion layer resulted in a delamination size of 50 microns. Each of the three adhesion layers according to the invention resulted in substantial improvement over the NiAl layer. Similar improvements were found for a SUL stack thickness of 130 nm, but for a SUL stack thickness of only 64 nm the delamination size for all four materials was small and in an acceptable range since the driving force for delamination is significantly reduced.

The thin film structures described above can be formed using standard thin film deposition techniques. The films are sequentially deposited with each film being deposited on the previous film. The atomic percent compositions given above are given without regard for the small amounts of contamination that invariably exist in sputtered thin films as is well known to those skilled in the art. The invention has been described with respect to particular embodiments, but other uses and applications for the adhesion layer according to the invention will be apparent to those skilled in the art.

The invention claimed is:

1. A thin film magnetic recording medium for perpendicular recording comprising:
a substrate;
an adhesion layer of an amorphous alloy of aluminum and titanium with approximately equal amounts of aluminum and titanium (+/−5 at. %) and wherein a total amount of aluminum and titanium is greater than or equal to 90 at. %;
a magnetically soft underlayer stack formed on the adhesion layer, the magnetically soft underlayer stack including first and second antiferromagnetically coupled magnetic layers separated by a spacer layer;
an underlayer deposited above the magnetically soft underlayer stack; and
a magnetic recording film deposited above the underlayer.

2. The thin film magnetic recording medium of claim 1 wherein the first and second antiferromagnetically coupled magnetic layers are cobalt alloys.

3. The thin film magnetic recording medium of claim 1 wherein the first and second antiferromagnetically coupled magnetic layers are alloys of cobalt, zirconium and tantalum.

4. The thin film magnetic recording medium of claim 1 wherein the amorphous alloy of aluminum and titanium includes zirconium.

5. The thin film magnetic recording medium of claim 1 wherein the amorphous alloy of aluminum and titanium includes from 1 at. % to 10 at. % zirconium.

6. The thin film magnetic recording medium of claim 1 wherein the adhesion layer is from 3 to 10 nm thick.

7. The thin film magnetic recording medium of claim 1 wherein the amorphous alloy of aluminum and titanium includes 5 at. % zirconium.

8. A thin film magnetic recording medium for perpendicular recording comprising:
a substrate;
an adhesion layer of an amorphous alloy of aluminum and titanium with approximately equal amounts of aluminum and titanium (+/−5 at. %) and wherein a total amount of aluminum and titanium is greater than or equal to 90 at. %;
a magnetically soft underlayer comprising at least a first magnetic layer including cobalt, zirconium, and tantalum formed on the adhesion layer;
an underlayer deposited above the magnetically soft underlayer; and
a magnetic recording film deposited above the underlayer.

9. The thin film magnetic recording medium of claim 8 wherein the magnetically soft underlayer further comprises a second magnetic layer including cobalt, zirconium, and tantalum separated by a spacer layer from the first magnetic layer and wherein the first and second magnetic layers are antiferromagnetically coupled.

10. The thin film magnetic recording medium of claim 8 wherein the amorphous alloy of aluminum and titanium includes zirconium.

11. The thin film magnetic recording medium of claim 8 wherein the amorphous alloy of aluminum and titanium includes from 1 at. % to 10 at. % zirconium.

12. A disk drive comprising:
a head for reading and writing magnetic information on a thin film magnetic recording medium; and
a disk with a thin film magnetic recording medium for perpendicular recording comprising:
a substrate;
an adhesion layer of an amorphous alloy of aluminum and titanium deposited on the substrate with approximately equal amounts of aluminum and titanium (+/−5 at. %) and wherein a total amount of aluminum and titanium is greater than or equal to 90 at. %;

a magnetically soft underlayer stack deposited on the adhesion layer, the magnetically soft underlayer stack including first and second antiferromagnetically coupled magnetic layers separated by a spacer layer;

an underlayer deposited above the magnetically soft underlayer stack; and a magnetic recording film deposited above the underlayer.

13. The disk drive of claim 12 wherein the first and second antiferromagnetically coupled magnetic layers include cobalt, zirconium and tantalum.

14. The disk drive of claim 12 wherein the amorphous alloy of aluminum and titanium includes zirconium.

15. The disk drive of claim 14 wherein the amorphous alloy of aluminum and titanium includes from 1 at. % to 10 at. % zirconium.

16. The disk drive of claim 12 wherein the first antiferromagnetically coupled magnetic layer comprises cobalt, zirconium and niobium.

* * * * *